United States Patent
Dykstra et al.

(10) Patent No.: US 8,147,651 B2
(45) Date of Patent: Apr. 3, 2012

(54) USE OF CYCLODEXTRINS FOR ODOR CONTROL IN PAPERMAKING SLUDGES, AND DEODORIZED SLUDGE AND PRODUCTS

(75) Inventors: Gerald M. Dykstra, Bartlett, TN (US); James N. Graham, Collierville, TN (US); Scott D. Branum, Midland, GA (US)

(73) Assignee: Buckman Laboratories International, Inc., Memphis, TN (US)

( * ) Notice: Subject to any disclaimer, the term of this patent is extended or adjusted under 35 U.S.C. 154(b) by 783 days.

(21) Appl. No.: 12/147,688

(22) Filed: Jun. 27, 2008

(65) Prior Publication Data
US 2009/0000752 A1    Jan. 1, 2009

Related U.S. Application Data

(60) Provisional application No. 60/946,764, filed on Jun. 28, 2007.

(51) Int. Cl.
*D21H 21/00* (2006.01)
*D21H 17/01* (2006.01)
*D21H 17/24* (2006.01)

(52) U.S. Cl. ........ 162/175; 162/189; 162/190; 210/727; 210/728; 210/730; 210/734; 422/5

(58) Field of Classification Search .......... 162/51, 162/70, 72, 100, 175, 189, 190; 210/727, 210/728, 730, 734, 928; 422/5
See application file for complete search history.

(56) References Cited

U.S. PATENT DOCUMENTS

| | | | |
|---|---|---|---|
| 3,425,910 A | 2/1969 | Armbruster et al. | |
| 3,426,011 A | 2/1969 | Parmerter et al. | |
| 3,453,257 A | 7/1969 | Parmerter et al. | |
| 3,453,258 A | 7/1969 | Parmerter et al. | |
| 3,453,259 A | 7/1969 | Parmerter et al. | |
| 3,453,260 A | 7/1969 | Parmerter et al. | |
| 3,459,731 A | 8/1969 | Gramera et al. | |
| 3,553,191 A | 1/1971 | Parmerter et al. | |
| 3,565,887 A | 2/1971 | Parmerter et al. | |
| 3,812,011 A | 5/1974 | Okada et al. | |
| 3,895,997 A * | 7/1975 | Haywood ............. | 162/100 |
| 4,317,881 A | 3/1982 | Yagi et al. | |
| 4,356,060 A * | 10/1982 | Neckermann et al. ..... | 162/181.6 |

(Continued)

FOREIGN PATENT DOCUMENTS

CN    1273946 A    11/2000
(Continued)

OTHER PUBLICATIONS

Hedges, "Industrial Applications of Cyclodextrins," Chemical Reviews, 1998, vol. 98, No. 5, pp. 2035-2044.
(Continued)

*Primary Examiner* — Eric Hug
*Assistant Examiner* — Peter Chin
(74) *Attorney, Agent, or Firm* — Kilyk & Bowersox, P.L.L.C.

(57) ABSTRACT

Methods to control and suppress odor in papermaking sludge are described. One method involves admixing sludge from a papermaking process and cyclodextrin to provide treated sludge with the cyclodextrin present in an effective amount to control odors in the treated sludge. The deodorized sludge may be used as a component of resin-wood composite products, such as composite decking materials, walls, flooring, casting forms, and the like.

26 Claims, 4 Drawing Sheets

U.S. PATENT DOCUMENTS

| | | | | |
|---|---|---|---|---|
| 4,418,144 A | | 11/1983 | Okada et al. | |
| 4,535,152 A | | 8/1985 | Szejtli et al. | |
| 4,616,008 A | | 10/1986 | Hirai et al. | |
| 4,638,058 A | | 1/1987 | Brandt et al. | |
| 4,678,598 A | | 7/1987 | Ogino et al. | |
| 4,734,393 A | * | 3/1988 | Lowe et al. | 502/404 |
| 4,738,923 A | | 4/1988 | Ammeraal | |
| 4,746,734 A | | 5/1988 | Tsuchiyama et al. | |
| 5,215,625 A | * | 6/1993 | Burton | 162/189 |
| 5,496,441 A | * | 3/1996 | Tran | 162/181.3 |
| 5,654,422 A | | 8/1997 | Hirsenkorn | |
| 5,772,847 A | * | 6/1998 | Simpson et al. | 162/189 |
| 5,879,666 A | | 3/1999 | Lucas et al. | |
| 6,033,679 A | | 3/2000 | Woo et al. | |
| 6,103,064 A | | 8/2000 | Asplund et al. | |
| 6,146,498 A | * | 11/2000 | Hsu et al. | 162/189 |
| 6,572,736 B2 | * | 6/2003 | Bush et al. | 162/189 |
| 6,623,848 B2 | | 9/2003 | Brehm et al. | |
| 6,656,923 B1 | | 12/2003 | Trinh et al. | |
| 6,667,030 B1 | | 12/2003 | Schneider | |
| 6,767,507 B1 | | 7/2004 | Woo et al. | |
| 6,808,636 B2 | | 10/2004 | Ward et al. | |
| 6,872,779 B2 | | 3/2005 | Mori et al. | |
| 2002/0160179 A1 | | 10/2002 | Marwah et al. | |
| 2002/0168286 A1 | * | 11/2002 | Demeyere et al. | 422/5 |
| 2005/0145355 A1 | * | 7/2005 | Wester et al. | 162/189 |
| 2006/0102299 A1 | | 5/2006 | Elgarhy et al. | |
| 2006/0124266 A1 | | 6/2006 | Xu et al. | |
| 2007/0137805 A1 | * | 6/2007 | Gerber et al. | 162/4 |
| 2008/0041541 A1 | | 2/2008 | DeLozier et al. | |
| 2008/0135194 A1 | | 6/2008 | Banerjee | |

FOREIGN PATENT DOCUMENTS

| | | |
|---|---|---|
| EP | 0251132 | 1/1988 |
| JP | 2002-282833 | 10/2002 |
| JP | 2004066105 A | 3/2004 |
| JP | 2006-26534 | 2/2006 |
| WO | 9845221 A1 | 10/1998 |
| WO | 0148025 A1 | 7/2001 |

OTHER PUBLICATIONS

Notification of Transmittal of the International Search Report and the Written Opinion of the International Searching Authority, or the Declaration; International Search Report and Written Opinion issued in corresponding International Patent Application No. PCT/US2008/068493 dated Oct. 9, 2008 (17 pages).

* cited by examiner

USE OF CYCLODEXTRINS FOR ODOR CONTROL IN PAPERMAKING SLUDGES, AND DEODORIZED SLUDGE AND PRODUCTS

This application claims the benefit under 35 U.S.C. §119 (e) of prior U.S. Provisional Patent Application No. 60/946,764, filed Jun. 28, 2007, which is incorporated in its entirety by reference herein.

BACKGROUND OF THE INVENTION

The present invention relates to processes for controlling odor in paper sludges and other papermaking waste, and more particularly relates to controlling and/or suppressing odor in paper sludges using cyclodextrins, and also the resulting deodorized sludges and composite products that incorporate the deodorized sludges.

The conventional manufacture of paper, cardboard, and related paper products typically results in large quantities of papermaking sludge as a by product. Large paper mills may produce many tons of sludge per day. The disposal of the sludge has been a significant concern for the papermaking industry.

The sludge by product arises during papermaking in the following general manner. Paper is conventionally made by draining a low consistency slurry of cellulose fiber pulp, fillers (e.g., clay), and additives (e.g., calcium carbonate or other materials as retention aids, latex dyes, pigments, defoamers, mixing catalysts such as casein or soy protein, etc.) through a paper machine "wire" (essentially an endless mesh or sieve). A certain amount of solid material passes through the wire with the suspension water, and thus it is not retained in the wet paper web formed on the wire. The drained suspension water and suspended solid material is commonly referred to as "white water," and is reused as far as practicable. However, complete recovery and reuse of this water and papermaking raw materials is not feasible, and a certain proportion is discharged from the paper machine as a waste water stream. This waste water stream from the paper machine typically is treated before it can be discharged from the paper mill. This treatment normally involves passage of the waste water stream through a clarifier or into a settling tank in which heavier components settle to the bottom of the tank and are drawn off as "sludge". The settled sludge is commonly referred to as the primary sludge. Papermaking sludges are generally divided into two types: primary and secondary. The primary sludge is partly dewatered (e.g., mechanical pressing via a belt filter press, vacuum filter, or screw press), which partly reduces the water content, e.g., to approximately 50% to 80% water content, providing a quantity of sludge for final disposal. Dewatered primary sludges may be dried in a rotary drum dryer, and the like. Secondary sludge is comprised of those particles which are too small to settle in any reasonable length of time from the waste water stream. Secondary sludge consists of colloidal and colloidal-sized particles. Secondary sludge has the consistency of gelatin and mechanical dewatering means are largely ineffective. The secondary sludge may be precipitated in a clarifier by use of a flocculent to precipitate the secondary sludge particles by the process of coagulation, that is, by binding together the minute particles to form flocs which are of sufficient size to precipitate in a clarifier. The secondary sludge may be treated, e.g., with flocculants to promote settling and recovery of this sludge content.

The resulting papermaking sludges often contain large amounts of water, wood fibers, wood particles ("fines"), fillers, additives, together with miscellaneous debris such as grit, sand, plastic particles, dirt, and, particularly if waste paper has been used by the mill as a raw material, ink particles, accumulations of adhesives and other particles used in the paper making process. There is no precise composition for this sludge because there are substantial variations in the wood and other feedstocks used; in the processing materials which must be used to make different types of paper products; and even considerable variation in the processes used by different paper makers in making similar products. This sludge is known in the industry by a variety of names, including: "primary waste treatment sludge", "paper mill sludge", "process residual", "waste treatment sludge", "waste treatment plant ('WTP') sludge", to name a few. For simplicity, the term "papermaking sludge" is used herein to denote this product, or merely as "sludge".

As indicated, the disposal of this papermaking sludge is a continuing problem for the paper manufacturers. Paper sludge has traditionally been disposed of, e.g., by landfilling, composting, utilization by the cement industry, and by incineration. However, suitable landfills may be difficult to locate and access for disposal of these sludges. Incineration is only a partial solution since ash deposits still must be handled and the incineration entails added costs of its own. The other conventional disposal approaches also have limitations. Attempts have been made to find economic uses for paper mill sludges which avoid the need for landfill or other disposal, and/or to recover reusable raw materials from the sludges. Some sludges can be burned for steam and/or power generation, but the practicality of this depends on the nature, amount and variability of the sludge produced. For example, sludges with high filler content, as might be produced in a paper mill specializing in fine paper production, may not be adequately combustible, and/or the amount of sludge available may not justify investment in a suitable combustion plant or adaptation of existing plants.

Another problem associated with papermaking sludge is odor. Papermaking sludge is a significant odor source. Paper sludge is typically deficient in oxygen, resulting in an environment ideal for the growth of anaerobic bacteria. These bacteria produce hydrogen sulfide, volatile fatty acid gases, mercaptans, and other undesirable gases. Even if substantially dried, ambient moisture conditions still can promote and sustain discernible odor development within sludge mass. Odor control of papermaking sludges may be attempted with harsh non-biodegradable materials such as chlorine or chlorinated compounds, enzymes, hydrogen peroxide, or other peroxygen containing materials where the application cost may be prohibitive and/or the result is often only temporary.

Cyclodextrins have been proposed for use in treating odors in household/textile applications for spray on fabric fresheners and as combined with textile fibers for clothing, but these environments have not involved dense anaerobic bioactive masses.

SUMMARY OF THE INVENTION

A feature of the present invention is to provide methods to control odor in papermaking sludge. A further feature is to provide deodorized sludges produced by these methods, and also composite products that incorporate the deodorized sludges.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages and in accordance with the purposes of the present invention, as embodied and broadly described herein, the present invention relates to a method to control odor in papermaking sludge comprising admixing papermaking sludge with cyclodextrin in an amount effective to control odors in the treated sludge. For purposes herein, "odor control" refers to (i) reducing or eliminating existing odors, and/or (ii) suppressing or inhibiting new odor development, in papermaking sludge. It has been discovered that cyclodextrins are useful in odor control in papermaking sludge per se or finished products that incorporate the sludge, such as resin-wood composites. The odor control mechanism in the cyclodextrin-treated sludge and composite products involves active odor elimination and prevention, and not odor masking, etc.

As used herein, the term "papermaking sludge" refers to residue separated from water recovered from a paper making process (commercial or experimental scale), in which the residue is in the form of a semisolid mass that is free or essentially free of solid particles buoyantly suspended in liquid (i.e, <1 wt % buoyantly suspended particles of total particles).

In a particular embodiment, a method is provided for controlling odor in sludge from a papermaking process, comprising the steps of a) providing a mixed sludge from a papermaking process; b) admixing the mixed sludge and a flocculent, providing flocculated sludge; c) dewatering the flocculated sludge, providing thickened sludge; d) conducting the thickened sludge into a screw press and discharging dry sludge as extrudate from the screw press, wherein cyclodextrin is added in conjunction with one or more of steps a), b), c) and d) in an effective amount to control odors in the dry sludge. The dry sludge discharged from the screw press comprises unsuspended solids with a moisture content of preferably no more than about 75 wt. %, or no more than 60 wt. %, particularly no more than about 50 wt. %, more particularly no more than about 45 wt. %, and even more particularly no more than about 35 wt. %. In one embodiment, the sludge discharged from the screw press is predominantly solids on a weight percentage basis (≧50%), and thus no more than 50 wt. % moisture. In a more particular embodiment, the dewatering comprises dewatering the sludge on a dewatering device selected from a gravity table, belt press, rotary screen thickener, or a combination thereof. In a further embodiment, the introducing of the cyclodextrin is done before step b).

In a particular embodiment, at least a major portion of the cyclodextrin can be alpha-cyclodextrin, beta-cyclodextrin, hydroxypropylated beta-cyclodextrin, or gamma-cyclodextrin, or any mixtures thereof. Although the effective amount may vary, depending on the sludge composition and conditions, the treated sludge can contain at least 0.01 weight %, or at least about 0.2 weight %, particularly from about 0.01 weight % to about 2.5 weight %, cyclodextrin to provide odor control. The sludge may comprise paper sludge obtained from the making of paper, such as from paper sludge obtained from the making of paper from virgin pulp from cellulosic materials, recycled waste paper, or combinations thereof.

In another embodiment, a product of the present invention comprises the treated sludge obtained as an admixture including sludge from a papermaking process and cyclodextrin in an effective amount to control odors in the admixture. The admixture may be dried and comminuted to provide a dried particulate form thereof. The dried form thereof can be conveniently and stably stored, transported, handled, and subsequently used, such as in a composite product manufacture incorporating the cyclodextrin-treated sludge as an ingredient thereof. Ingredients of the sludge, such as fiber and solid fillers, can replace more costly original materials while being compatible with the structural properties and performance desired for the composite. Even if the composite becomes moistened or re-moistened, the cyclodextrin continues to control and suppress odor development in the sludge component thereof, providing a more commercially attractive product.

In yet another embodiment, there is a method for controlling odor in resin-wood composite materials containing sludge from a papermaking process, comprising: a) admixing a sludge from a papermaking process and cyclodextrin, providing cyclodextrin-treated sludge; b) forming a mixture by mixing the cyclodextrin-treated sludge with cellulosic particles and a binder material; and c) compressing the mixture by applying heat and pressure effective to form a unitary shaped article. The compressing step may be performed with pressure plates. It also may be performed in a mold comprising at least one die having a surface imparting a three-dimensional non-planar shape to at least a part of the unitary article.

In another embodiment, there is an article comprising a unitary mixture containing from about 25 to about 75 weight % of a comminuted papermaking sludge containing about 20 weight % or less moisture and at least about 0.01 weight % cyclodextrin (e.g., 0.02 to 2.5 weight %); about 25 to about 75 weight % of fibrous, cellulosic pieces; and a resinous particle board binder in an amount effective to consolidate the sludge and cellulosic material, the weight percentages being based on the total dry weight of the papermaking sludge and the cellulosic material. The article may comprise at least one planar portion. The article also may be a molded article comprising at least one integral non-planar portion. The mixture may contain from about 2 to about 50 weight % of said binder, as solids based on the total dry weight of the papermaking sludge and cellulosic pieces. The cellulosic pieces may be wood strands, wood particles, wood chips, wood flakes, or wood fibers, or any combinations thereof. The article may be used as decking material, wall material, and/or flooring material. The cyclodextrin content of these composites provides odor control throughout the shelf life and service life of the sludge-containing product, even when exposed to moist or humid conditions.

Laboratory tests, described in the examples set forth infra, have been conducted with solutions of cyclodextrin, e.g., beta-cyclodextrin, hydroxypropylated beta-cyclodextrin, and gamma-cyclodextrin, using paper mill sludges. All these types of cyclodextrins tested were found to be effective at reducing or minimizing odors from papermaking sludges.

It is to be understood that both the foregoing general description and the following detailed description are exemplary and explanatory only and are only intended to provide a further explanation of the present invention, as claimed.

The accompanying drawings, which are incorporated in and constitute a part of this application, illustrate some of the embodiments of the present invention and together with the description, serve to explain the principles of the present invention.

DETAILED DESCRIPTION OF THE PRESENT INVENTION

The present invention relates to methods to control odor and suppress odor development in papermaking sludges and similar materials, and products containing these deodorized paper sludges.

In the present invention, cyclodextrins are used for odor control, capture, and/or suppression of volatile sulfur based compounds and/or volatile organic compounds found in papermaking sludges or discharges or process water from the papermaking process. Cyclodextrins have been found to minimize the release of odors from papermaking sludges, such as sludge that has been through the dewatering step in sludge processing, such as from a centrifuge, belt press, screw presses, or other devices that removes water from papermaking sludges. When cyclodextrins are added as an aqueous solution to wet cake sludge solids and thoroughly admixed, the odors from hydrogen sulfide, or other sulfur containing compounds, and volatile organic compounds found in papermaking sludges, are minimized or suppressed. Papermaking sludges that respond to treatment with cyclodextrins can include primary sludges, secondary sludges, and all mixtures of primary and secondary sludges. Dewatered sludges are sometimes stored in outdoor piles, and the cyclodextrin treatment of the present invention serves to minimize or suppress odors from these piles. Alternatively, sludges that contain cellulosic fibers can be dried and admixed with binder and additional cellulosic material to form resin wood composites, such as synthetic decking material or engineered lumber, including engineered woods that may be cut or sawn. The deodorized sludge may be used as a component of engineered wood products, such as resin-wood composite roof or balcony decking materials, walls, floorings, casting forms, and the like. Treatment with cyclodextrins of the sludges used as a component of these synthetic materials minimizes or suppresses the odors when the composite materials are formed, e.g., by heating at temperatures up to 400° Fahrenheit and pressures up to 800 psi.

Figure 1:
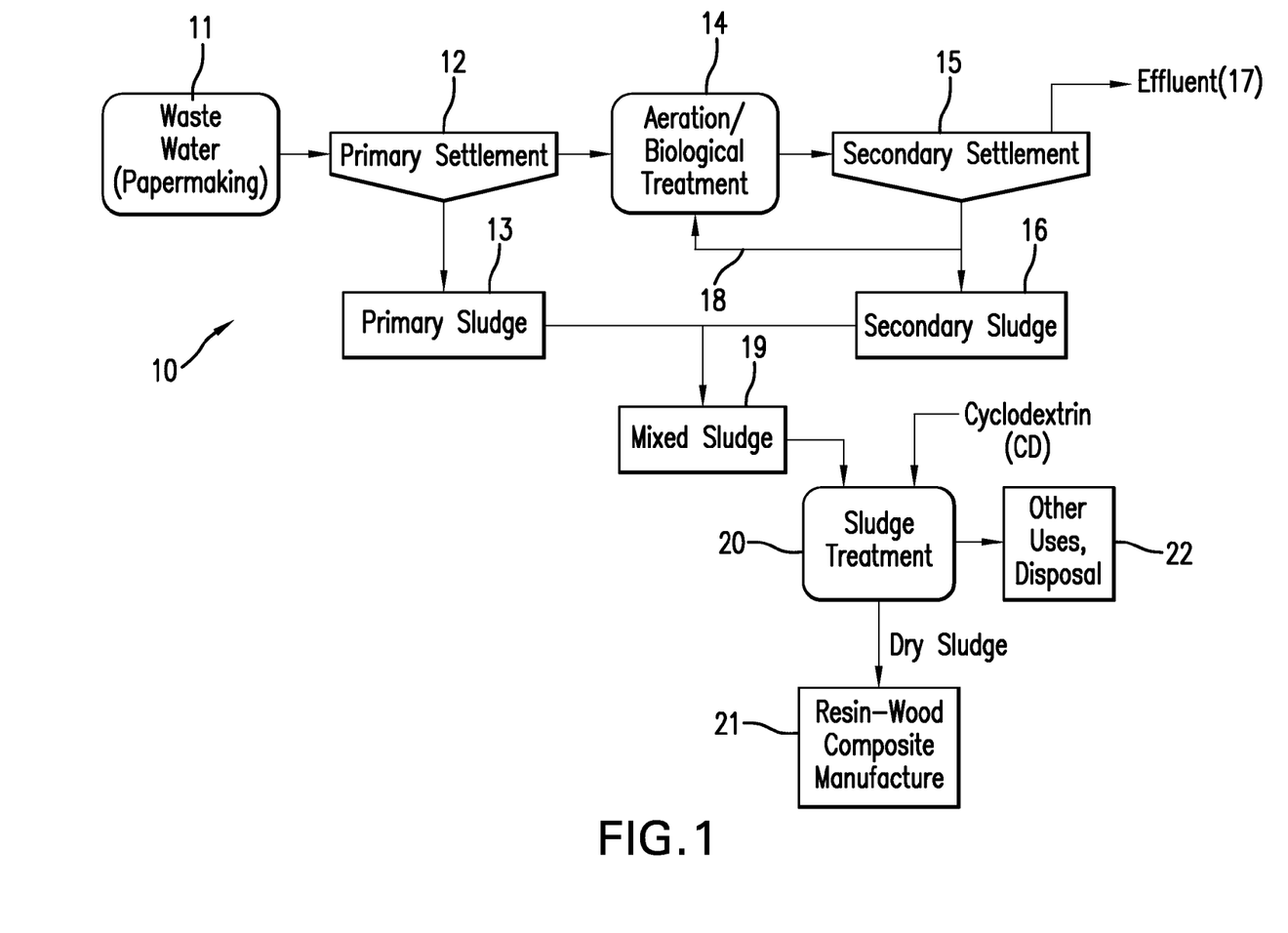
FIG. 1 illustrates a general process flow diagram for introducing cyclodextrin to a sludge treatment according to an embodiment of the present invention.

Process for Cyclodextrin Treatment of Sludge. Referring to FIG. 1, in the illustrated process (10), papermaking sludge is collected and treated with cyclodextrin (CD) effective to provide a deodorized dry sludge. Primary treatment of the papermaking waste water (11) involves discharging the waste water into a primary settling tank or clarifier (12). The water containing suspended solids is then allowed to remain in the settling tank for a period of time (detention time) sufficient to permit the solid particulates to gravitationally settle to the bottom of the tank as sludge (e.g., 30 mins to 360 mins). This sludge is periodically or continuously removed from the bottom of the tank as primary sludge (13). Secondary sludge (16) is generated from the use of specially provided decomposers to break down remaining organic material in wastewater after primary treatment. The active agents in these systems are micro-organisms, mostly bacteria, which need the available organic matter to grow. There are various generally known techniques for secondary sludge processing, such as activated sludge, bacterial beds, lagooning, and filtration or biofiltration. In activated sludge, for example, bacteria are kept in suspension in a vessel (14) in aerobic conditions. After treatment in this manner, the treated water is decanted off in a secondary clarifier (15) to separate fluid effluent from activated sludge (16), which settles out in the secondary clarifier. The primary and secondary sludges described above can be combined to provide mixed sludge (19). A portion of the activated sludge (18) may be used to reseed the biological treatment (14). The fluid effluent (17) decanted from the secondary clarifier (15) may be used to generate tertiary sludge to remove remaining unwanted nutrients such as nitrogen and phosphorus through high performance bacterial or chemical processes. Although not categorically excluded, the tertiary sludge generally is not included in the mixed sludges treated in accordance with this invention. Although not shown, the sludges also can be transformed into digested sludges by generally known techniques before cyclodextrin and dewatering treatments of the sludge according to embodiments of the present invention. As indicated in FIG. 1, the mixed sludge is fed to a "sludge treatment" section (20) of the process (10). The dry sludge obtained from the sludge treatment can be used in the production of shaped engineered composite wood products (21) or other uses or can be landfilled for stable disposal (22).

Figure 2:
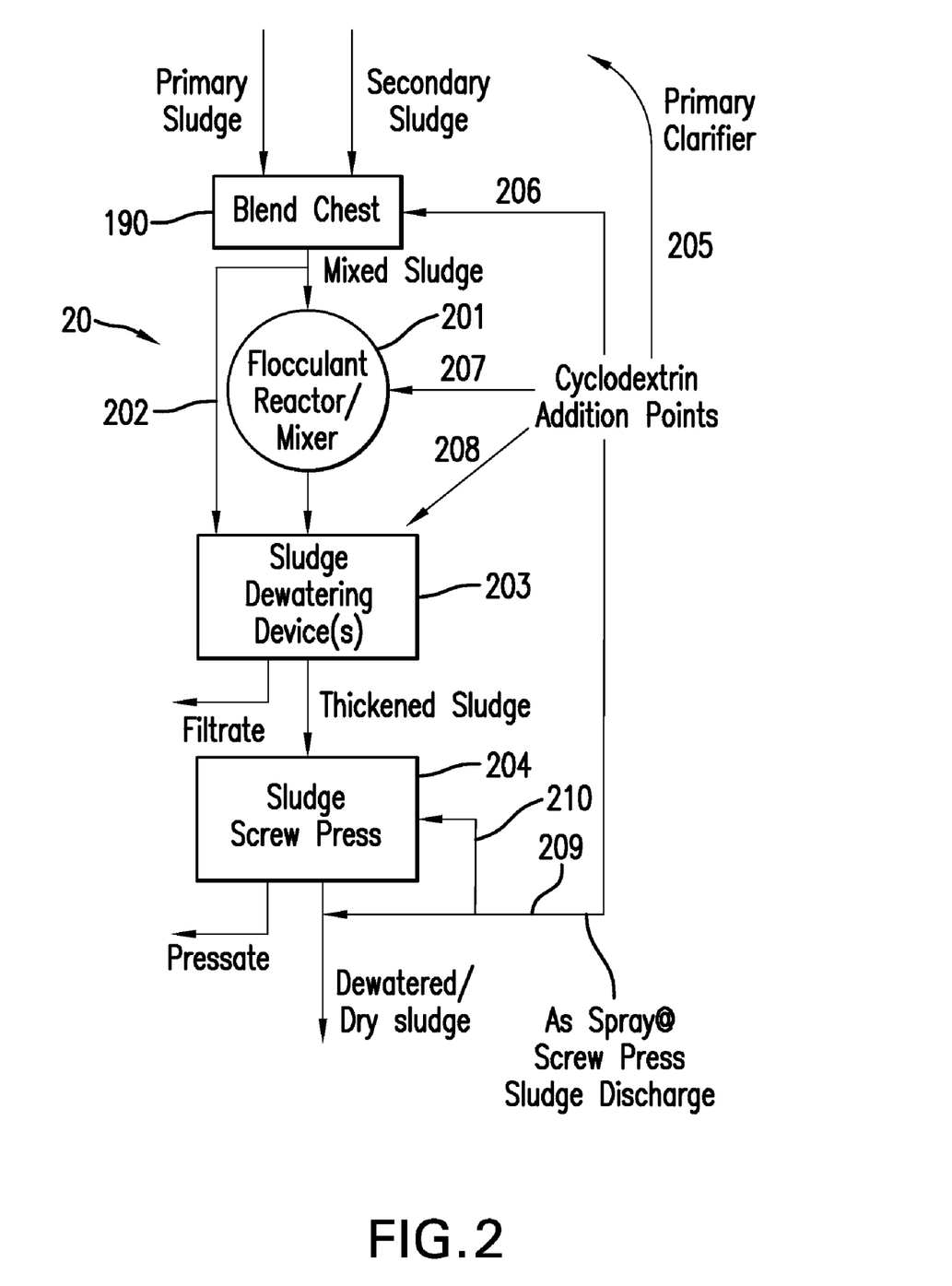
FIG. 2 illustrates a general process flow diagram of the sludge treatment shown in FIG. 1 according to an embodiment of the present invention.

Referring to FIG. 2, the mixed sludge (19) is formed at a blend chest (190) from which the mixed sludge is conducted to "sludge treatment" section (20) of process (10). As shown in FIG. 2, the sludge treatment section (20) is illustrated as a series of process steps and stations including optional flocculant addition in a mixer/reactor (201) (or bypass thereof via line (202) from blend chest (190)), sludge dewatering comprising dewatering section (203) and sludge screw pressing section (204), to yield dry sludge. Cyclodextrin can be introduced at one or more of numerous different addition locations (205)-(209) within the process. In general, for purposes of deodorizing the finished sludge, the cyclodextrin can be introduced before, during or after sludge treatment, or in combinations thereof. For example, before the sludge treatment, cyclodextrin can be introduced before sludge treatment at the clarifier (12), shown by (205), or at the blend chest (190), shown by (206). During sludge treatment, the cyclodextrin can be added at the flocculant reactor (201), shown by (207), or at the sludge dewatering device(s) (203), shown by (208). The cyclodextrin also can be added at the discharge outlet of the screw press (204), shown by (209), and/or within the screw press, shown by (210).

Referring further to FIG. 2, a step of promoting flocculation in the sludge can be carried out in mixer/reactor (201) by essentially any technique known in the art. In a particular embodiment, the step of promoting the formation of flocs is performed by adding one or more flocculants to the sludge. Suitable flocculants for treatment of sludge are generally known in the art and may be selected based, for example, on the particular sludge materials being processed. Representative examples of flocculants include, for example, polymeric polymers, such as cationic polyacrylamide; minerals, such as alum, lime; and combinations thereof. The flocculated sludge that is fed on to the dewatering device(s) (203) may have a consistency and texture similar to "wet cement." The step of adding the cyclodextrin to the sludge can be done before, during, or after the sludge undergoes flocculation. In a particular embodiment, cyclodextrin can be added before, during, and/or after pretreatment of the sludge with a flocculant. The cyclodextrin retains its deodorization efficacy even where added before flocculation. In an alternative embodiment, sludge may be transported directly from the blend chest (201) to sludge thickening device(s) (203), as indicated by process bypass flow path (202) in FIG. 2, without any intervening flocculation treatment before dewatering and screw pressing.

Papermaking Sludge. Primary sludges, secondary sludges, or mixed sludges combining both of these types of sludges, can be treated with cyclodextrin in accordance with embodiments of the present invention. The papermaking sludge used in connection with this present invention can be obtained from any commercially available source. It may be recovered from the papermaking process by the paper mill itself or obtained from a paper mill off-site for use with this process. The composition of the papermaking sludge may vary depending upon the particular paper making process, although it typically will include, amongst other things, relatively fine wood fibers and inorganic fillers.

The papermaking sludge which can be treated in accordance with this invention has water and solids content in relative proportions such that the sludge is a semisolid mass that is free or essentially free of solid particles buoyantly suspended in liquid (i.e., <1 wt % buoyantly suspended particles of total particles). In a preferred embodiment, the sludge contains no more than 75% by weight moisture (e.g., 25% by weight to 50% by weight, 35% by weight to 45% by weight). The sludge that is treated and the resulting sludge from the subsequent dewatering step(s) preferably is an unsuspended solid that has a low water content. The sludge is not in solution or in suspension, but is a mass of viscous sludge. The solid content of the papermaking sludge can vary with the source of the paper and the particular paper being manufactured. The solid component of the sludge can generally comprise clay, cellulosic fibers, calcium carbonate and small quantities of casein, proteins, starch, latex dyes, defoamers and/or titanium dioxide. One non-limiting example of papermaking sludge contains, on a solids basis, about 40% by weight clay, about 30% by weight cellulosic fibers, about 19% by weight calcium carbonate, about 5% by weight casein, protein and starch, about 5% by weight latex dye and defoamers, and about 1% by weight titanium dioxide. The cellulosic fibers present in the sludge treated with cyclodextrin according to embodiments of the invention can comprise virgin cellulosic fibers, recycled cellulosic fibers, synthetic fibers, or any combination thereof. The virgin fibers can originate from, for example, from bleached kraft softwood pulp, bleached kraft hardwood pulp, bleached kraft fluff pulp, unbleached kraft softwood pulp, unbleached kraft hardwood pulp, bleached sulfite softwood pulp, bleached chemi-thermomechanical softwood pulp, bleached chemi-thermomechanical hardwood pulp, bleached sulfite softwood pulp for melamine, or combinations thereof. The reclaimed fibers can originate from, for example, old corrugated containers (OCC), old newspapers (ONP), old magazines (OMG), mixed office waste (MOW), sorted office paper (SOP), and combinations thereof. Colloidal pigments brought into the sludge by the papermaking waste may be, for example, calcium carbonate, silicates, calcined kaolin, hydrous kaolin, China clay, talc, mica, dolomite, silica, zeolite, gypsum, satin white, titania, titanium dioxide, calcium sulfate, barium sulfate, aluminum trihydrate, lithopone, blanc fixe, plastic pigment, or combinations thereof. Protein particulate brought into the sludge from the papermaking waste may comprise, for example, legume particles, powders, and/or flours. Other papermaking additives brought into the sludge by the papermaking waste may include, for example, latex binders, latex dyes, preservatives, pH-adjusters, levelling agents, lubricants, defoamers, wetting agents, optical brighteners, pigment-dispersing agents, cross-linkers, water retention aids, viscosity modifiers or thickeners, and/or combinations thereof.

Cyclodextrins also help reduce odors from the aeration of primary sludge clarifiers, which is done to keep the primary sludge from becoming anaerobic and generating gases that will cause some of the sludge to float and complicate the settling of the primary sludges. Where cyclodextrin is added at the primary clarifier, cyclodextrins will not affect or impair the ability of the helpful organisms in secondary sludge that allow some of the waste materials to be converted to food (simple sugars) for the organisms and allow high efficiency of the secondary sludge clarification steps. Similarly, where added before and/or during flocculation of the sludge, the cyclodextrins will not affect or impair the flocculation process.

Cyclodextrins. As used herein, the term "cyclodextrin," abbreviated herein occasionally as "CD," includes any of the known cyclodextrins such as unsubstituted cyclodextrins containing from six to twelve glucose units, especially, alpha-, beta-, gamma-cyclodextrins, and mixtures thereof, and/or their derivatives, and/or mixtures thereof, that are capable of forming inclusion complexes with perfume ingredients.

Cyclodextrins are natural decomposition products of starches, and they may be prepared in bioreactors using appropriate enzymes, as generally known in the field. Alpha-($\alpha$-), beta-($\beta$-), and gamma-($\gamma$-) cyclodextrins can be commercially obtained, such as from, among others, Aldrich Chemical or Wacker Chemical. There are many derivatives of cyclodextrins that are known. Representative derivatives are those disclosed in U.S. Pat. No. 3,426,011, Parmerter et al., issued Feb. 4, 1969; U.S. Pat. Nos. 3,453,257, 3,453,258, 3,453,259, and 3,453,260, all in the names of Parmerter et al., and all issued Jul. 1, 1969; U.S. Pat. No. 3,459,731, Gramera et al., issued Aug. 5, 1969; U.S. Pat. No. 3,553,191, Parmerter et al., issued Jan. 5, 1971; U.S. Pat. No. 3,565,887, Parmerter et al., issued Feb. 23, 1971; U.S. Pat. No. 4,535,152, Szejtli et al., issued Aug. 13, 1985; U.S. Pat. No. 4,616,008, Hirai et al., issued Oct. 7, 1986; U.S. Pat. No. 4,638,058, Brandt et al., issued Jan. 20, 1987; U.S. Pat. No. 4,746,734, Tsuchiyama et al., issued May 24, 1988; and U.S. Pat. No. 4,678,598, Ogino et al., issued Jul. 7, 1987, all of said patents being incorporated herein by reference. Examples of cyclodextrin derivatives suitable for use herein are hydroxypropyl-$\beta$-cyclodextrin, methyl-$\beta$-cyclodextrin, and hydroxyethyl-$\beta$-cyclodextrin, and of different degrees of substitution, which are commercially available from Wacker Chemical. Water-soluble derivatives are also highly desirable. The individual cyclodextrins also may be linked together, e.g., using multifunctional agents to form oligomers, co-oligomers, polymers, copolymers, and the like.

Mixtures of cyclodextrins and/or precursor compounds may be used to provide a mixture of complexes. For example, such mixtures, e.g., may provide a broader range of odor control. Mixtures of cyclodextrins can conveniently be obtained by using intermediate products from known processes for the preparation of cyclodextrins including those processes described in U.S. Pat. No. 3,425,910, Armbruster et al., issued Feb. 4, 1969; U.S. Pat. No. 3,812,011, Okada et al., issued May 21, 1974; U.S. Pat. No. 4,317,881, Yagi et al., issued Mar. 2, 1982; U.S. Pat. No. 4,418,144, Okada et al., issued Nov. 29, 1983; and U.S. Pat. No. 4,738,923, Ammeraal, issued Apr. 19, 1988, all of said patents being incorporated herein by reference. Preferably at least a major portion of the cyclodextrins are alpha-cyclodextrin, beta-cyclodextrin, and/or gamma-cyclodextrin, more preferably beta-cyclodextrin. Some cyclodextrin mixtures are commercially available from, e.g., Ensuiko Sugar Refining Company, Yokohama, Japan.

Processes for the production of cyclodextrins and complexes are described in U.S. Pat. No. 3,812,011, Okada, Tsuyama, and Tsuyama, issued May 21, 1974; U.S. Pat. No. 4,317,881, Yagi, Kouno and Inui, issued Mar. 2, 1982; U.S. Pat. No. 4,418,144, Okada, Matsuzawa, Uezima, Nakakuki, and Horikoshi, issued Nov. 29, 1983; U.S. Pat. No. 4,378,923, Ammeraal, issued Apr. 19, 1988, all of said patents being incorporated herein by reference. Materials obtained by any of these variations are acceptable for the purposes of this invention. It is also acceptable to initially isolate the inclusion complexes directly from the reaction mixture by crystallization. For example, cyclodextrin complexes can be dispersed homogeneously in polyalkylene glycol carriers that are liquid or molten at less than about 100° C. The level of the carrier has to be relatively high so that the complex can be supported and the mixture of complex and carrier can be relatively fluid when the carrier is in a liquid state. Preferred carriers are those that are solid at room temperature but can become molten or fluid below about 100° C., more preferably those that can become molten or fluid below about 80° C.

Cyclodextrin-Treated Paper Sludges. In treating the sludge for deodorization purposes, the cyclodextrin may be added by itself, or in a dilute or concentrated solution or suspension with a solvent or non-solvent. Although the effective amount may vary, depending on the sludge composition and conditions, the treated sludge generally contains at least about 0.01 weight %, particularly from about 0.01 weight % to about 2.5 weight %, total cyclodextrin (e.g., 0.05 to 1.5 wt %; 0.1 to 1.0 wt %) on a cyclodextrin solids: total sludge solids basis, to provide odor control.

The cyclodextrin may be used alone or in combination with other additives. It may be introduced into the sludge at a single point or in multiple points, in a continuous or non-continuous manner. It may, for example, be introduced into a process stream using a metering pump, or it may be gravity fed. When referring herein to cyclodextrin addition, the addition can entail addition of the cyclodextrin separately into the process apparatus, or in combination with another feedstream fed to the same apparatus, or both. For example, the sludge and cyclodextrin may be combined with primary effluent drawn from a settling tank where the sludge is being collected at the paper mill. Alternatively, the cyclodextrin can be introduced at the blend chest or some other convenient location upstream of the flocculation reactor and dewatering devices. The cyclodextrin also can be added at the flocculation reactor. Alternatively, the cyclodextrin may be combined with the sludge in an RST (rotary screw thickener). For example, the paper mill can use an RST to partially dewater the sludge before it is fed into a screw press or belt press for further dewatering. Flocculants can be added to a feed tank before the RST to encourage fast dewatering. In various embodiments, the cyclodextrin can be added at the top of the feed tank after the flocculant is added. This can allow enough contact time with the cyclodextrin to encourage the release of even more water in the RST. The cyclodextrin can also be added by direct injection into the screw press after the first consolidation zone, which would still allow admixing of the cyclodextrin throughout the sludge. Most screw presses are 30 feet or longer in length and have access points during the consolidation where a tap can be installed to inject the cyclodextrin solution into the sludge. Another additional point can be a spray at the end of the screw press where the consolidation sludge falls off the screw into a hopper where it can be collected in trucks for haul away or simply drop onto the work floor where it can be removed and stored on a pile prior to use as a supplemental fuel in the paper mill or hauled away for disposal. Although cyclodextrin can be added as early as the primary clarifier, as indicated above, that introduction site may be less desirable as a higher dosage of cyclodextrin generally may be needed in view of the large volume of waste material still being handled and under treatment at that location. At the screw press, if cyclodextrin is sprayed on the dry sludge as it is discharged from the unit, the distribution of the cyclodextrin in the sludge may be less ideal than that which can be achieved by introductions made further upstream in the sludge treatment process and after the primary clarifier. Thus, in particular embodiments, the cyclodextrin is combined with sludge or sludge containing material after the primary clarifier and before the screw press, although not limited thereto.

Figure 3:
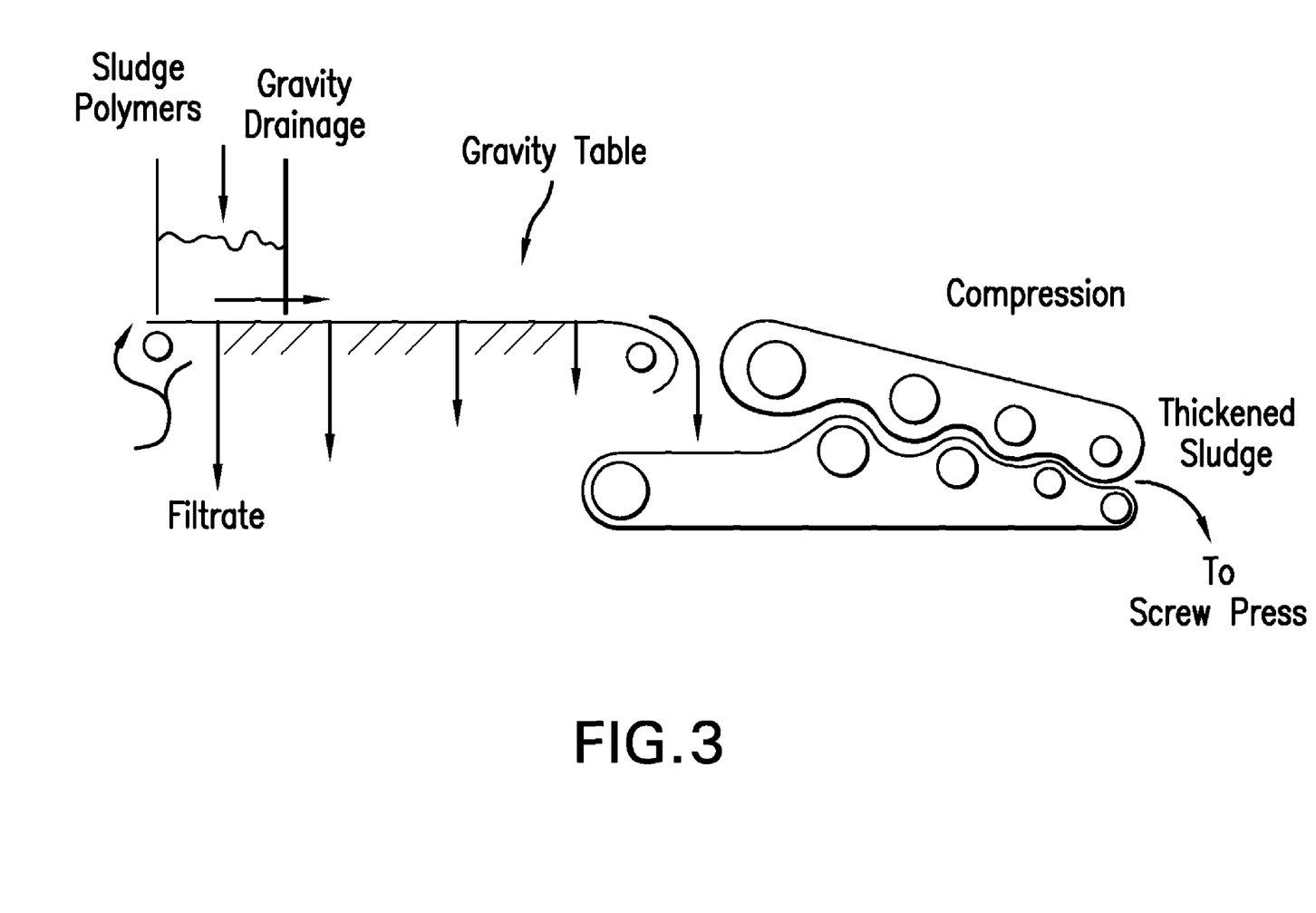
FIG. 3 illustrates sludge dewatering according to an embodiment of the present invention.

Dewatering of Cyclodextrin-Treated Paper Sludges. In a particular embodiment of the present invention, the sludge, primary or mixed, that has optionally been treated with a flocculant, such as a dewatering polymer, is dewatered (dried) in several stages of processing. For example, the sludge is initially partly dewatered on a dewatering device or devices to provide a thickened sludge, and then the thickened sludge is further processed in a screw press to provide a cyclodextrin-treated dry sludge as an extrudate. Various types of dewatering devices or apparatuses can be used alone or in combination with each other to dewater the sludge or flocculated sludge in particular. For example, the dewatering apparatus applied to the sludge upstream of the screw press can include a gravity table, a belt press, a gravity table and belt press, a rotary screen thickener, a rotary vacuum drum, and/or a centrifuge, and so forth. Referring to FIG. 3, in one embodiment a method of sludge dewatering to form thickened sludge involves the passage of sludge onto a gravity table that forms part of a belt press for gravity drainage. The sludge is then transferred from the gravity table to a belt press for additional dewatering. In general, two opposed traveling belts gradually come together along a sludge treatment zone. Sludge is squeezed and carried along the opposed belt surfaces. Water drains out of the squeezed sludge for drainage through the lowermost belt. As indicated above, the gravity table or belt press alone alternatively could be used for dewatering device (204). Another type of dewatering apparatus involves passage of the sludge through a porous medium under a vacuum operating force. The medium can be located on a rotary drum that has a sludge inlet connected to the drum interior. The vacuum draws water outwardly through the filtering medium, leaving a filter cake of sludge on the interior surface of the drum. Pressure filtration can also be used to remove water from the sludge. Filter cloths are supported on frames arranged in a parallel array. Sludge under pressure enters spaces between the frames in such a manner that clear filtrate passes through the various cloth panels, the dewatered sludge collecting as a filter cake on the cloth panels. Centrifugal separation techniques can also be used for dewatering sludge. The sludge is fed into a rotating bowl, where the sludge collects on the interior surface of the bowl, water exiting through an opening in the end wall of the bowl. Finally, a helical blade scrapes the filter cake from the bowl surface. Illustrative commercial equipment vendors of these types of dewatering devices include, for example, Alfa Laval and Siemens. The amount of dewatering and thickening achieved at dewatering device (203) can vary depending on a variety of factors, such as the sludge composition, choice of dewatering device and operational conditions thereof, and so forth.

Figure 4:
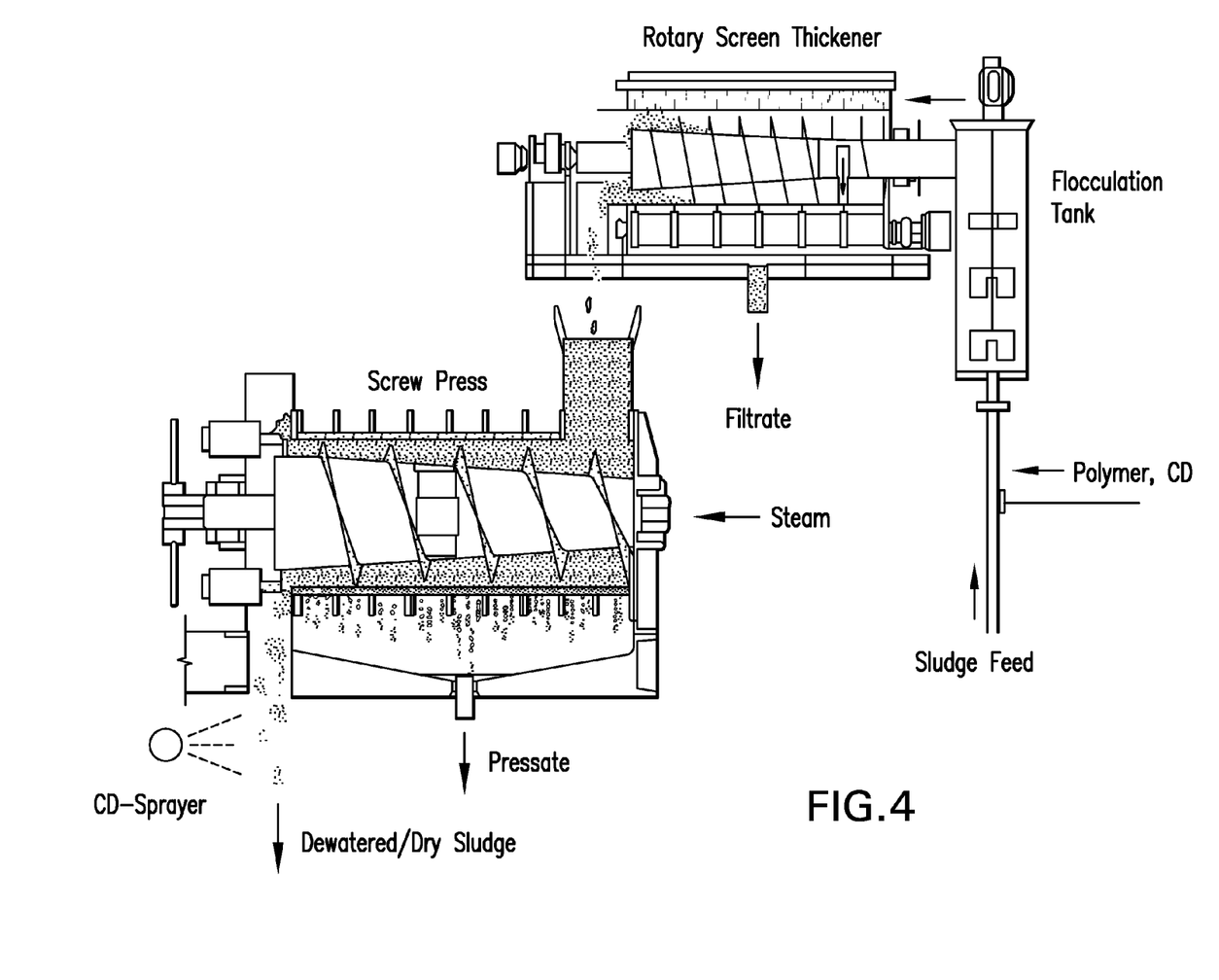
FIG. 4 illustrates an alternative embodiment for sludge dewatering according to another embodiment of the present invention.

Referring to FIG. 4, in another embodiment the flocculant treated sludge can be dewatered by a rotary screen thickener before the partly dewatered sludge is fed into the head box of a screw press for additional dewatering and pressing. The screen press includes flighting for conveying sludge under pressure from the head box to the discharge outlet. Steam is introduced into the device as illustrated in FIG. 4. The dry or dewatered sludge that is discharged from the screw press has the texture of a fluffy extrudate. It not a wet cake. The dry sludge discharged from the screw press comprises unsuspended solids with a total moisture content of no more than about 75 wt. %, or not more than about 60 wt. %; particularly no more than about 50 wt. %, more particularly no more than about 45 wt. %, and even more particularly no more than about 35 wt. % (e.g., 10 wt % to 75 wt %, 20 wt % to 55 wt %, 25 wt % to 50 wt %, 30 wt % to 50 wt %, and the like). In one embodiment, the sludge discharged from the screw press is predominantly solids (total) on a weight percentage basis ($\geq$50%), and thus no more than 50 wt. % total moisture. For purposes herein, "moisture" refers to water. The rotary screen thickener and screw press can have conventional constructions used in pulp and paper sludge dewatering or thickening applications. Illustrative commercial equipment vendors of these types of equipment include, for example, FKC Co., Ltd. However, these dewatering devices are not previously known to have been applied to dewatering and pressing of sludges treated with cyclodextrin in accordance with embodiments of the present invention.

The cyclodextrin-treated sludge discharged from the screw press or other final dewatering device may be dried and comminuted to provide a dry flowable particulate form of the material. Drying can be done, for example, with a gas-fired dryer. Comminuting can be done, for example, with a mill, such as a hammer mill. That is, the cyclodextrin-treated papermaking sludge may tend to form into relatively large lumps having a moisture content substantially above that acceptable for heat-pressing or molding, such as discussed below. Accordingly, the cyclodextrin-treated papermaking sludge preferably is further dried to a moisture content in the order of about 20 weight % or less, such as from about 4 to about 10 weight % or from 1 weight % to 15 weight %, based on the dry weight of the solids, and comminuted in a suitable device, such as a mill (e.g., hammer mill), prior to the blending step. The moisture content to which the papermaking sludge is dried depends primarily upon the particular type of resin being used as discussed below. During the comminuting step, the papermaking sludge preferably is broken down into a size not substantially larger than the individual wood fibers therein. If the moisture content of the papermaking sludge is less than about 15 weight %, the drying and comminuting steps can be reversed if desired and the drying step can be eliminated for papermaking sludges having a moisture content less than about 10 weight %. While the particle size of the comminuted papermaking sludge is not particularly critical, the average size generally should be from about 32 to about 200 screen mesh.

The dried form of cyclodextrin-treated sludge can be conveniently and stably stored, transported, handled, and subsequently used, such as in a composite product manufacture incorporating the cyclodextrin-treated sludge as an ingredient thereof.

Resin-Wood Composites. The dried cyclodextrin-treated papermaking sludge can be used in the manufacture of resin-wood fiber composites or engineered fiber composites having simple or complex shapes. By "resin-wood composite," it is meant a composite material that comprises wood, resin, and optionally other additives, such as adhesives or waxes, in addition to the cyclodextrin-treated sludge material described herein. Non-limiting examples of wood composite materials include oriented strand board ("OSB"), waferboard, chipboard, particle board, fiberboard, plywood, and the like. These materials can be used as building construction materials, and other uses. They can be sawn and cut to desired sizes and dimensions. As used herein, "wood" is intended to mean a cellular structure, with the cell walls being composed of cellulose and hemicellulose fibers bonded together by lignin material.

Even though papermaking sludges contain substantial amounts of wood fibers, articles formed from papermaking sludge and binder alone generally do not have adequate structural strength for many purposes. In accordance with the invention, the structural strength is increased by admixing a fibrous cellulosic material and at least one resinous binder, such as a thermosetting resin or an organic polyisocyanate, with the cyclodextrin-treated papermaking sludge, and heat compressing the resulting mixture or furnish into the desired shape of the article. The resulting resin-wood composites have good engineered wood performance and odor control even with significant sludge content.

In a preferred method, dried and comminuted cyclodextrin-treated papermaking sludge is admixed with the fibrous cellulosic material and resinous particle board binder or the like, the resulting mixture or furnish is heat compressed in a press or introduced into a mold including at least two separate parts defining a mold chamber defining the desired shape of the molding. The press is pressed onto the mixture or lay-up, or the mold is closed, and sufficient heat and pressure is applied to the mixture to compress it into substantially the desired shape and size of the product and sufficient to consolidate the mixture into a unitary resin-bonded article. The composition of the furnish and general process parameters are discussed below in more detail.

Wood. The fibrous cellulosic material includes natural and synthetic materials in fiber or strand-like form. The fibrous cellulosic fibers can be sourced from virgin fibers, reclaimed (recycled) fibers, or combinations thereof. The fibrous cellulosic material may originate from newly cut tree logs and/or waste wood products such as from lumber manufacture and wood pulping operations. The cellulosic material generally is in the form of cellulosic pieces, such as strands, particles, flakes, shavings, wafers, fibers, veneer, chips, wood pulp, and the like. Other suitable fibrous cellulosic materials include scrap paper and paperboard, rags, straw, corn stalks, hemp, flax, jute and the like. Generally, natural or processed cellulosic materials are preferred.

Preferred wood composite materials utilized in this invention are derived from naturally occurring hard or soft woods, singularly or mixed, whether such wood is dried (having a moisture content of from 2 weight % to 12 weight %) or green (having a moisture content of from 30 weight % to 200 weight %). Preferably, the wood composite materials comprise dry wood parts having a moisture content of from about 3 to 8 weight %. Typically, the raw wood starting materials, either virgin or reclaimed, are cut into strands, wafers, flakes, and/or particles of desired size and shape, which are well-known to one of ordinary skill in the art. As used herein, "flakes", "strands", "wafers", and "particles" are commonly referred to herein as wood or cellulosic "pieces." While wood from a wide variety of hardwood and softwood species can be used, wood from species commonly used in the manufacture of paper products generally are preferred. Representative examples of suitable woods include those from aspen, maple, oak, balsam fir, pine, cedar, spruce, locust, beech, and/or birch, and the like. The size of the fibrous cellulosic particles is not particularly critical. They preferably may have an average length of about 1/16 inch to about 3/4 inches, an average width of about 0.020 inch to about 0.060 inch and an average thickness of about 0.010 inch to about 0.030 inch.

Binder Resin. Suitable binders include those used in the manufacture of particle board and similar pressed fibrous products. Representative examples of suitable binders include thermosetting resins such as phenol-formaldehyde (e.g., resol-type resins and novolac-type resins), resorcinol-formaldehyde, melamine-formaldehyde, urea-formaldehyde, urea-furfural and condensed furfuryl alcohol resins, and organic polyisocyanates, either alone or combined with urea- or melamine-formaldehyde resins. Particularly suitable polyisocyanates are those containing at least two active isocyanate groups per molecule, including diphenylmethane diisocyanates, m- and p-phenylene diisocyanates, chlorophenylene diisocyanates, toluene di- and triisocyanates, triphenylmethene triisocyanates, diphenylether-2,4,4'-trisicocyanate and polypheylpolyisocyanates, particularly diphenylmethane-4,4'-diisocyanate. A binder system including both a urea-formaldehyde resin and a polyisocyanate, at a solids weight ratio of about 4:1 to about 1:1, is suitable for many applications.

The amount of binder added during the blending step depends primarily upon the specific binder used, the amount and type of fibrous reinforcing material used, and the desired characteristics of the pallet. Generally, the amount of binder added can be from about 2 to about 15 weight %, preferably from about 4 to about 10 weight %, as solids based on the total dry weight of the papermakidng sludge and bark particles. When a polyisocyanate is used alone or in combination with a urea-formaldehyde resin, the amounts can be more toward the lower ends of these ranges. Other conventional additives optionally may be included in the resin-wood compositions, such as fire retardants, fillers, and the like used in amounts effective for their intended function.

Resin-Wood Composite Manufacture. In one illustrative application, known amounts of comminuted, dried cyclodextrin-treated papermaking sludge and fibrous cellulosic particles are introduced into a conventional blender, such as a paddle-type like blender, wherein a predetermined amount of a resinous particle binder and, optionally, additives such as water proofing agents, dimensional stabilizing agents and the like, is applied to the particles as they are tumbled or agitated in the blender. The amount of papermaking sludge in the blended mixture, based on the total dry weight of the sludge and separately added cellulosic solids therein, preferably is from about 25 to about 75 weight %, most preferably from about 40 to about 60 weight %, and the amount of cellulosic pieces preferably is from about 25 to about 75 weight %, most preferably from about 40 to about 60 weight %.

The binder can be added in either dry or liquid form. To maximize coverage of the papermaking sludge and wood pieces, the binder preferably is applied by spraying droplets of the binder in liquid form onto the particles as they are being tumbled or agitated in the blender. To improve water resistance of the pallet, a conventional liquid wax or phenol emulsion preferably is also sprayed onto the particles during the blending step. The amount of wax or phenol added generally is from about 0.5 to about 2 weight %, as solids based on the total dry weight of the papermaking sludge and bark particles. Other additives such as coloring agents, fire retardants, insecticides, fungicides and/or resins for enhancing dimensional stability (e.g., polyethylene, polyvinylchloride, etc.) may also be added, such as during the blending step. The binder and other additives, can be added separately in any sequence or in combined form.

The moistened mixture of papermaking sludge and cellulosic pieces and binder or furnish from the blending step generally is formed into a loosely-felted, single or multi-layered lay-up, which is compressed into a desired shape under heat and pressure, such as, e.g., by heating the furnish at temperatures up to about 500° Fahrenheit and pressures up to about 900 psi, typically between about 300° to about 500° Fahrenheit and pressures from about 300 psi to about 800 psi, for about 1 to about 15 minutes residence time in the press or mold. As can be appreciated, the greater the pressure and heat applied, the less the time needed to consolidation, and conversely lesser pressure and heat typically entails longer compression cycles. The lay-up may have a substantially uniform thickness, and may be deposited as multiple separate layers before consolidation into a unitary component. After such a stack of plies is assembled, the lay-up is heat pressed to consolidate the assembly into unitary member.

Generally, the moisture content of the furnish after completion of blending, including the original moisture content of the papermaking sludge and the moisture added during blending along with the binder, wax and other additives, can be from about 5 to about 15 weight %, preferably from about 8 to about 12 weight %. The presence of some moisture in the papermaking sludge and the cellulosic pieces enhances uniform heat transfer throughout the lay-up during the molding step, thereby ensuring uniform curing. However, excessive amounts of water tends to degrade some binders, particularly urea-formaldehyde resins, and generates steam which can cause blisters and build up of internal pressure. At high moisture contents, the clay usually present in papermaking sludge tends to form an impervious mat which inhibits release of water vapor. On the other hand, if the wood fibers in the papermaking sludge and the wood pieces are too dry, they tend to absorb excessive amounts of the binder, leaving an insufficient amount on the surface to obtain good bonding, and the surfaces tend to case harden which inhibits the desired chemical reaction between the binder and cellulose in the wood fibers and the bark particles. The amount of resin and water is balanced to address these various considerations.

The heat-pressed consolidated article can be used in a wide variety of applications, including as resin-wood composite roof or balcony decking materials, walls, floorings, casting forms, and the like. These resin-wood composites can be cut and sawn to size, if desired or needed. Ingredients of the cyclodextrin-treated sludge, such as fiber and solid fillers, can replace at least a portion of more costly original materials while being compatible with the structural properties and performance desired for the composite. Even if the composite becomes moistened or re-moistened, the cyclodextrin continues to control and suppress odor development in the sludge component thereof, providing a more commercially attractive product.

The present invention will be further clarified by the following examples, which are intended to be purely exemplary of the present invention, in which parts are proportions by weight unless otherwise specified.

EXAMPLES

Example 1

The effect of cyclodextrins in reduction of measurable hydrogen sulfide ($H_2S$) in papermaking sludge was examined.

Test samples were prepared using 200 g of papermaking sludge obtained from MeadWestvaco mill, Mahrt, Ala., which were added to 800 g of 50 mM phosphate buffer solution (pH 7.1). The phosphate buffer was prepared by combining 2.503 g $KH_2PO_4$ (anhydrous)/liter and 5.47 g $K_2HPO_4$ (anhydrous)/liter. Different forms of cyclodextrin, viz., beta-cyclodextrin and hydroxypropylated beta-cyclodextrin, were tested at different dosage levels in sludge samples.

When a cyclodextrin ("CD") was added to a given sample, it was dissolved in the 50 mM buffer solution before sludge addition. Dosages indicated in Table 1 are based on weight of buffer solution. For instance, a 0.5% dosage corresponds to 4 grams of cyclodextrin in 800 grams of buffer solution. 200 g sludge was added to the 800 g cyclodextrin-containing buffer solution, and the resulting mixture was shaken to ensure good mixing and allowed to settle. Aliquots of supernatant were taken for $H_2S$ testing. Some of the samples were sparged with $N_2$ for 30 minutes at 30 mL $N_2$ per minute using a MITC sparging system hooked to sparge from parent sample into clean buffer. The sparging was done to transfer the $H_2S$ into clean buffer solution to test the amount of $H_2S$ present. Other samples were unsparged. Clean buffer solutions were tested using Hach test method #57 for residual sulfide. Corrections were made for dilution of the sample and for reporting results as ppm $H_2S$. Controls of sludge also were tested, which had no cyclodextrin added to the buffer solution.

TABLE 1

| No sparge | ppm $H_2S$ per liter | |
| --- | --- | --- |
| Control (no CD) | 0.983 | |
| 2% beta CD | 0 | |
| Sparged | ppm $H_2S$ per liter | % reduction in $H_2S$ vs. Control |
| Control (no CD) | 0.186 | 0 |
| 0.1% beta CD | 0.043 | 76.9 |
| 0.25% beta CD | 0.011 | 94.1 |
| 0.5% beta CD | 0.016 | 89.9 |
| 2% beta CD | 0.012 | 91.7 |
| Control (no CD) | 0.2005 | 0 |
| 0.1% HP beta CD | 0.0408 | 79.65 |
| 0.25% HP beta CD | 0.0497 | 75.21 |
| 0.5% HP beta CD | 0.0213 | 89.38 |
| 2% HP beta CD | 0.0053 | 97.36 |
| Sparged | | % reduction in $H_2S$ vs. Control |
| Control (no CD) | | 0 |
| 0.1% HP beta CD | | 76.9 |
| 0.25% beta CD | | 94.1 |
| 0.5% beta CD | | 89.9 |
| 2% beta CD | | 91.7 |
| Control (no CD) | | 0 |
| 0.1% HP beta CD | | 79.65 |
| 0.25% HP beta CD | | 75.21 |
| 0.5% HP beta CD | | 89.38 |
| 1.0% HP beta CD | | 97.36 |

As shown by the results in Table 1, all sludge samples treated with cyclodextrin achieved at least a 75% reduction in hydrogen sulfide gas development as compared to control samples lacking the cyclodextrin.

A cyclodextrin containing composition of the present invention was then sent to a southern paper mill for an experimental trial. The mill was an integrated mill, and produced roughly 100 dry tons per day of sludge, consisting of inorganic and organic waste from the waste treatment process. The cyclodextrin containing composition was mixed in a tote, and the dosage of the made-down product was added to mixed sludge in the blend chest at a rate or roughly 0.1 pounds per pound of dry sludge. The treated sludge was then transferred to the loading area, and allowed to sit in the sun for a week. Each day, the operator would make a qualitative assessment of the odor of the pile by smelling the pile, stirring a section of it, and smelling it again. After a week, the sludge pile remained odor free, and was loaded into trucks to be transferred offsite. During transfer, a period when the odor would normally be overwhelming, the sludge remained odor-free.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for controlling odor in sludge from a papermaking process, comprising flocculating sludge from a papermaking process, at least partly dewatering the sludge after said flocculating on at least one dewatering device, and admixing the sludge and cyclodextrin after the flocculating and the dewatering to provide treated sludge with the cyclodextrin present in an effective amount to control odors in the treated sludge.

2. The method of claim 1, wherein at least a major portion of said cyclodextrin is alpha-cyclodextrin, beta-cyclodextrin, hydroxypropylated beta-cyclodextrin, gamma-cyclodextrin, or mixtures thereof.

3. The method of claim 1, wherein said treated sludge contains at least about 0.01 weight % cyclodextrin.

4. The method of claim 1, wherein said treated sludge is formed into particle form and dried.

5. The method of claim 1, wherein said sludge comprises paper sludge obtained from the making of paper from virgin pulp.

6. The method of claim 1, wherein said sludge comprises paper sludge obtained from the making of virgin pulp from cellulosic materials.

7. The method of claim 1, wherein said sludge comprises paper sludge obtained from the making of paper from recycled waste paper.

8. The method of claim 1, wherein the treated sludge comprising no more than 75 wt. % moisture based on total weight of the treated sludge.

9. The method of claim 1, wherein the treated sludge comprising no more than 50 wt. % moisture based on total weight of the treated sludge.

10. A method for controlling odor in sludge from a papermaking process, comprising:
  a) providing a mixed sludge from a papermaking process;
  b) admixing the mixed sludge and a flocculant, providing flocculated sludge;
  c) dewatering the flocculated sludge, providing thickened sludge;

d) conducting the thickened sludge into a screw press and discharging dry sludge as extrudate from the screw press, wherein introducing of cyclodextrin is done in conjunction with step d) in an effective amount to control odors in the dry sludge.

11. The method of claim 10, wherein the dry sludge comprising no more than 75 wt. % moisture based on total weight of the thickened sludge.

12. The method of claim 10, wherein the dry sludge comprising no more than 50 wt. % moisture based on total weight of the thickened sludge.

13. The method of claim 10, wherein said dewatering comprises dewatering the sludge on a dewatering device with a gravity table, belt press, rotary screen thickener, or a combination thereof.

14. The method of claim 1, further comprising:
forming a mixture by mixing said treated sludge with cellulosic pieces and a binder material;
compressing said mixture by applying heat and pressure effective to form a unitary shaped article.

15. The method of claim 14, wherein said compressing step is performed with opposing pressure plates supporting and pressing the mixture from opposite sides thereof.

16. The method of claim 14, wherein said compressing step is performed in a mold comprising at least one die having a surface imparting a three-dimensional non-planar shape to at least a part of the unitary article.

17. The method of claim 14, further comprising the step of drying said sludge to obtain a solids content of from about 90 percent to about 100 percent prior to mixing said sludge with said cellulosic pieces and said binder material.

18. The method of claim 14, wherein at least a major portion of said cyclodextrin is alpha-cyclodextrin, beta-cyclodextrin, hydroxypropylated beta-cyclodextrin, gamma-cyclodextrin, or mixtures thereof.

19. The method of claim 14, further comprising the steps of drying and comminuting said sludge to produce sludge in a form of dry flowable particulate material, prior to mixing said sludge with said cellulosic pieces and said binder material.

20. A unitary-shaped article formed from the method of claim 14, said unitary-shaped article comprising a unitary mixture containing about 25 to about 75 weight % of a comminuted dried papermaking sludge containing about 20 weight % or less moisture and at least about 0.01 weight % cyclodextrin; about 25 to about 75 weight % of a fibrous cellulosic pieces; and a resinous particle board binder in an amount effective to consolidate the sludge and cellulosic material, said weight percentages being based on the total dry weight of the papermaking sludge and the cellulosic material, wherein the cyclodextrin is capable of continuing to control and suppress odor development in the sludge when the article becomes moistened or re-moistened.

21. The article of claim 20, wherein said mixture contains from about 2 to about 50 weight % of said binder, as solids based on the total dry weight of the papermaking sludge and cellulosic pieces.

22. The article of claim 20, wherein said cellulosic pieces are wood strands, wood particles, wood chips, wood flakes, wood fibers, or combinations thereof.

23. The article of claim 20, wherein at least a major portion of said cyclodextrin is alpha-cyclodextrin, beta-cyclodextrin, hydroxypropylated beta-cyclodextrin, or gamma-cyclodextrin, or mixtures thereof.

24. The article of claim 20, wherein said article comprises at least one planar portion.

25. The article of claim 20, wherein said article comprises at least one integral non-planar portion.

26. The article of claim 20, wherein said article is decking material.

* * * * *